(12) United States Patent
Lin et al.

(10) Patent No.: US 12,438,464 B2
(45) Date of Patent: Oct. 7, 2025

(54) POWER CONVERTER AND POWER CONVERSION METHOD

(71) Applicant: Delta Electronics, Inc., Taoyuan (TW)

(72) Inventors: Hung-Chieh Lin, Taoyuan (TW);
Yi-Ping Hsieh, Taoyuan (TW);
Hsin-Chih Chen, Taoyuan (TW);
Hung-Yu Huang, Taoyuan (TW);
Jin-Zhong Huang, Taoyuan (TW)

(73) Assignee: Delta Electronics, Inc., Taoyuan (TW)

(*) Notice: Subject to any disclaimer, the term of this patent is extended or adjusted under 35 U.S.C. 154(b) by 184 days.

(21) Appl. No.: 18/518,268

(22) Filed: Nov. 22, 2023

(65) Prior Publication Data

US 2025/0112548 A1    Apr. 3, 2025

(30) Foreign Application Priority Data

Sep. 28, 2023 (CN) .......................... 202311274168.7

(51) Int. Cl.
*H02M 3/158* (2006.01)
*H02M 1/00* (2006.01)

(52) U.S. Cl.
CPC ......... *H02M 3/158* (2013.01); *H02M 1/0074* (2021.05); *H02M 3/1588* (2013.01)

(58) Field of Classification Search
CPC .. H02M 1/0067; H02M 1/0074; H02M 3/156; H02M 3/158; H02M 3/1588
See application file for complete search history.

(56) References Cited

U.S. PATENT DOCUMENTS

| | | | |
|---|---|---|---|
| 8,611,107 B2 | 12/2013 | Chapman et al. | |
| 8,817,510 B2 | 8/2014 | Esram et al. | |
| 9,584,044 B2 | 2/2017 | Zhou et al. | |
| 2009/0085537 A1* | 4/2009 | Nakabayashi | H02M 3/158 323/273 |

(Continued)

FOREIGN PATENT DOCUMENTS

| | | |
|---|---|---|
| CN | 103683468 A | 3/2014 |
| CN | 109768706 A | 5/2019 |

(Continued)

OTHER PUBLICATIONS

Jeong Seo-Gwang et al, High-efficiency three-phase bidirectional dc-ac converter for energy storage systems, IET Power Electronics, 2019, vol. 12 Iss. 8, pp. 2031-2037.

*Primary Examiner* — Gary L Laxton
(74) *Attorney, Agent, or Firm* — KIRTON McCONKIE; Evan R. Witt

(57) ABSTRACT

A power converter and a power conversion method are provided and capable of bus capacitor voltage balance based on inherent inductor components of the power converter. Compared with the conventional approach that adds a balance circuit, the power converter and the power conversion method can reduce a size of overall circuit and improve a power density. In addition, two relays of the power converter are configured to switch switching states such that two inductors store or release energy, thereby transmitting electrical energy between two bus capacitors and two load capacitors. The power converter and the power conversion method are able to realize energy balance and hybrid power supply and satisfy various load requirements.

15 Claims, 10 Drawing Sheets

(56) References Cited

U.S. PATENT DOCUMENTS

2012/0307526 A1* 12/2012 Senanayake ........ H02M 3/1584
                                                         363/16
2015/0244268 A1    8/2015 Meinecke et al.
2018/0331625 A1* 11/2018 Somani .................. H02M 1/08
2019/0273445 A1    9/2019 Cho et al.

FOREIGN PATENT DOCUMENTS

| CN | 109889042 A   | 6/2019  |
|----|---------------|---------|
| CN | 107959417 B   | 10/2019 |
| CN | 112271928 B   | 4/2022  |
| WO | 2021110172 A1 | 6/2021  |

* cited by examiner

POWER CONVERTER AND POWER CONVERSION METHOD

CROSS-REFERENCE TO RELATED APPLICATION

This application claims priority to China Patent Application No. 202311274168.7 filed on Sep. 28, 2023. The entire contents of the above-mentioned patent applications are incorporated herein by reference for all purposes.

FIELD OF THE INVENTION

The present disclosure relates to a power converter and a power conversion method, and more particularly to a power converter and a power conversion method capable of realizing energy balance and hybrid power supply.

BACKGROUND OF THE INVENTION

In a DC/DC converter with two bus capacitors, the two bus capacitors are connected between a positive input terminal and a negative input terminal, and thus an input side has a positive bus capacitor voltage and a negative bus capacitor voltage. When the DC/DC converter performs voltage reduction and supplies power to an output side, an imbalance between the positive and negative bus capacitor voltages may be caused by different duty cycles of switches within the DC-DC converter.

To balance the positive and negative bus capacitor voltages, conventional approaches usually add a balance circuit to adjust the bus capacitor voltages. However, the additional balance circuit increases a size of overall circuit and thus reduces a power density.

Therefore, there is a need of providing a power converter and a power conversion method in order to overcome the drawbacks of the conventional technologies.

SUMMARY OF THE INVENTION

The present disclosure provides a power converter and a power conversion method which realize a balance of capacitor voltages based on inherent inductor components of converter. Compared with the conventional approach that adds a balance circuit, the power converter and the power conversion method of the present disclosure can reduce a size of overall circuit and improve a power density. In addition, through transmitting electrical energy between capacitors and inductors, the power converter and the power conversion method of the present disclosure are able to realize energy balance and hybrid power supply and satisfy various load requirements.

In accordance with an aspect of the present disclosure, a power converter is provided. The power converter includes a first upper-bridge voltage conversion module, a first lower-bridge voltage conversion module, a second upper-bridge voltage conversion module, and a second lower-bridge voltage conversion module. The first upper-bridge voltage conversion module includes a first bus capacitor, a first switch, a second switch, a first inductor and a first load capacitor, and the first switch, the second switch and the first inductor are electrically connected between the first bus capacitor and the first load capacitor. The first lower-bridge voltage conversion module includes a second bus capacitor, a third switch, a fourth switch, a second inductor and a second load capacitor, and the third switch, the fourth switch and the second inductor are electrically connected between the second bus capacitor and the second load capacitor. The second upper-bridge voltage conversion module includes a fifth switch and a first relay. A first terminal of the fifth switch is connected to a first terminal of the first bus capacitor, the first relay is configured to selectively switch to connect the first inductor to a second terminal of the fifth switch or a first terminal of the first load capacitor, and a second terminal of the first load capacitor is connected to a second terminal of the first bus capacitor. The second lower-bridge voltage conversion module includes a sixth switch and a second relay. A first terminal of the second load capacitor is connected to a first terminal of the second bus capacitor, the second relay is configured to selectively switch to connect the second inductor to a first terminal of the sixth switch or a second terminal of the second load capacitor, and a second terminal of the sixth switch is connected to a second terminal of the second bus capacitor. The first switch, the second switch, the third switch, the fourth switch, the fifth switch, the sixth switch, the first relay and the second relay are configured to switch switching states for making the first inductor and the second inductor store or release energy, thereby transmitting electrical energy between the first bus capacitor, the second bus capacitor, the first load capacitor and the second load capacitor.

In accordance with another aspect of the present disclosure, a power conversion method is provided. The power conversion method is applied to the power converter of the present disclosure and includes steps of: detecting voltages across the first bus capacitor, the second bus capacitor, the first load capacitor and the second load capacitor for determining to perform one of a first operation mode, a second operation mode, a third operation mode, a fourth operation mode and a fifth operation mode; and according to the one of the first to fifth operation modes, controlling switching states of the first switch, the second switch, the third switch, the fourth switch, the fifth switch, the sixth switch, the first relay and the second relay to make the first inductor and the second inductor store or release energy, thereby transmitting electrical energy between the first bus capacitor, the second bus capacitor, the first load capacitor and the second load capacitor.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only.

Figure 1:
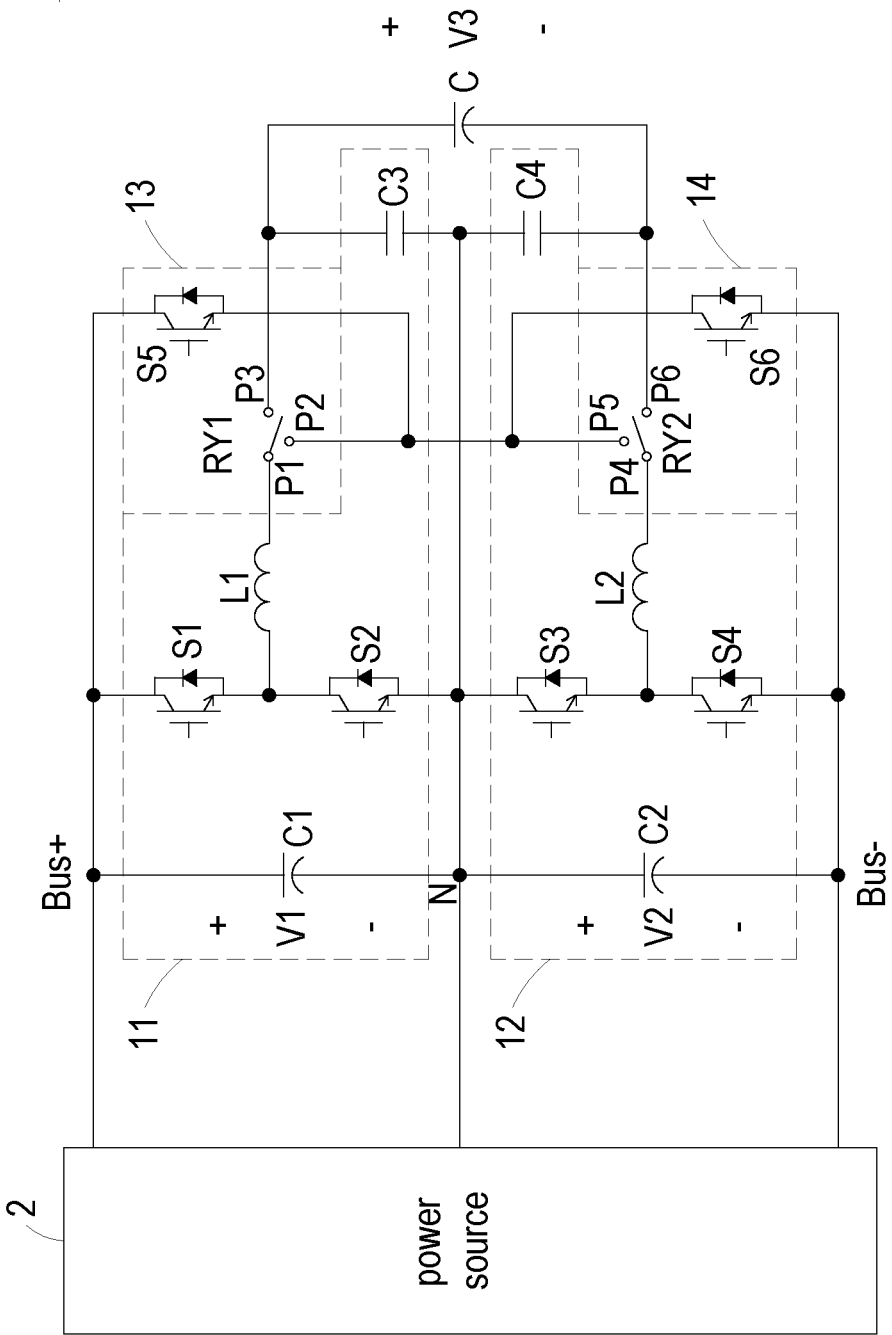
FIG. 1 is a schematic circuit diagram illustrating a power converter according to a first embodiment of the present disclosure.

FIG. 1 is a schematic circuit diagram illustrating a power converter according to a first embodiment of the present disclosure. As shown in FIG. 1, the power converter 1 includes a first upper-bridge voltage conversion module 11, a first lower-bridge voltage conversion module 12, a second upper-bridge voltage conversion module 13, and a second lower-bridge voltage conversion module 14.

The first upper-bridge voltage conversion module 11 includes a first bus capacitor C1, a first switch S1, a second switch S2, a first inductor L1, and a first load capacitor C3. The first switch S1, the second switch S2, and the first inductor L1 are electrically connected between the first bus capacitor C1 and the first load capacitor C3. The first lower-bridge voltage conversion module 12 includes a second bus capacitor C2, a third switch S3, a fourth switch S4, a second inductor L2, and a second load capacitor C4. The third switch S3, the fourth switch S4, and the second inductor L2 are electrically connected between the second bus capacitor C2 and the second load capacitor C4.

The second upper-bridge voltage conversion module 13 includes a fifth switch S5 and a first relay RY1. A first terminal of the fifth switch S5 is connected to a first terminal of the first bus capacitor C1. The first relay RY1 is configured to selectively switch to connect the first inductor L1 to a second terminal of the fifth switch S5 or a first terminal of the first load capacitor C3. A second terminal of the first load capacitor C3 is connected to a second terminal of the first bus capacitor C1. In this embodiment, the first relay RY1 includes a first moving contact P1, a first static contact P2, and a second static contact P3 respectively connected to the first inductor L1, the second terminal of the fifth switch S5, and the first terminal of the first load capacitor C3. When the first relay RY1 switches the first moving contact P1 to connect to the first static contact P2, the first inductor L1 is connected to the second terminal of the fifth switch S5. When the first relay RY1 switches the first moving contact P1 to connect to the second static contact P3, the first inductor L1 is connected to the first terminal of the first load capacitor C3.

The second lower-bridge voltage conversion module 14 includes a sixth switch S6 and a second relay RY2. A first terminal of the second load capacitor C4 is connected to a first terminal of the second bus capacitor C2. The second relay RY2 is configured to selectively switch to connect the second inductor L2 to a first terminal of the sixth switch S6 or a second terminal of the second load capacitor C4. A second terminal of the sixth switch S6 is connected to a second terminal of the second bus capacitor C2. In this embodiment, the second relay RY2 includes a second moving contact P4, a third static contact P5, and a fourth static contact P6 respectively connected to the second inductor L2, the first terminal of the sixth switch S6, and the second terminal of the second load capacitor C4. When the second relay RY2 switches the second moving contact P4 to connect to the third static contact P5, the second inductor L2 is connected to the first terminal of the sixth switch S6. When the second relay RY2 switches the second moving contact P4 to connect to the fourth static contact P6, the second inductor L2 is connected to the second terminal of the second load capacitor C4. Further, the second terminal of the fifth switch S5 and the first terminal of the sixth switch S6 are connected to each other. FIG. 1 exemplifies the first to sixth switches S1-S6 as IGBTs (insulated gate bipolar transistors), but the possible implementations of these switches are not limited thereto. For example, the first to sixth switches S1-S6 may be MOSFETs (metal-oxide-semiconductor field effect transistors).

The first switch S1, the second switch S2, the third switch S3, the fourth switch S4, the fifth switch S5, the sixth switch S6, the first relay RY1, and the second relay RY2 are configured to switch their switching states such that the first inductor L1 and the second inductor L2 store or release energy. Thereby, electrical energy is transmitted between the first bus capacitor C1, the second bus capacitor C2, the first load capacitor C3, and the second load capacitor C4. Consequently, voltage balance of the capacitors is achieved based on inherent inductor components of converter. Compared with the conventional approach that adds a balance circuit, the power converter and the power conversion method of the present disclosure can reduce the size of overall circuit and improve the power density. In addition, through transmitting electrical energy between capacitors and inductors, the power converter and the power conversion method of the present disclosure is able to realize energy balance and hybrid power supply and satisfy various load requirements.

Additionally, the first bus capacitor C1 is configured to establish a first voltage V1, the second bus capacitor C2 is configured to establish a second voltage V2, and the first load capacitor C3 and the second load capacitor C4 are configured to establish a third voltage V3. In the embodiment shown in FIG. 1, the first voltage V1 and the second voltage V2 serves as input-side voltages, and the third voltage V3 serves as an output-side voltage. Under this circumstance, the power converter 1 may further include a power source 2 and a load (e.g., a capacitor C shown in FIG. 1), and the power source 2 is connected to a positive input terminal Bus+, a neutral terminal N, and a negative input terminal Bus− of the power converter 1. The positive input terminal Bus+ is connected to the first terminal of the first bus capacitor C1, the negative input terminal Bus− is connected to the second terminal of the second bus capacitor C2, and the load (the capacitor C) is connected to the first terminal of the first load capacitor C3 and the second terminal of the second load capacitor C4. The neutral terminal N is connected to the second terminal of the first bus capacitor C1, the first terminal of the second bus capacitor C2, the second terminal of the first load capacitor C3, the first terminal of the second load capacitor C4, a second terminal of the second switch S2, and a first terminal of the third switch S3. In fact, the power converter 1 of the present disclosure is a bidirectional power converter. Specifically, in another embodiment, the third voltage V3 may serve as an input-side voltage, and correspondingly the first voltage V1 and the second voltage V2 may serve as output-side voltages. In this case, the positions of the power source 2 and the load are interchanged, the specific operation thereof can be derived from the embodiment shown in FIG. 1, and thus detailed descriptions thereof are omitted herein.

In an embodiment, as shown in FIG. 1, first and second terminals of the first switch S1 are connected to the first terminal of the first bus capacitor C1 and a first terminal of the second switch S2 respectively, and the second terminal of the second switch S2 is connected to the second terminal of the first bus capacitor C1. A first terminal of the first inductor L1 is connected to the second terminal of the first switch S1 and the first terminal of the second switch S2, and a second terminal of the first inductor L1 is connected to the first relay RY1.

In an embodiment, as shown in FIG. 1, the first terminal and a second terminal of the third switch S3 are connected to the first terminal of the second bus capacitor C2 and a first terminal of the fourth switch S4 respectively, and a second terminal of the fourth switch S4 is connected to the second terminal of the second bus capacitor C2. A first terminal of the second inductor L2 is connected to the second terminal of the third switch S3 and the first terminal of the fourth switch S4, and a second terminal of the second inductor L2 is connected to the second relay RY2.

In an embodiment, the power converter 1 is controlled by a controller (not shown), such as a digital signal processor, a programmable logic controller, or a microcontroller. The controller is configured to detect a variation rate of voltages across the capacitors and determines one of the first to fifth operation modes that the power converter 1 performs accordingly, thereby achieving the energy balance and hybrid power supply. In another embodiment, the controller receives a user command to control the power converter 1 to perform a specific operation mode for energy dispatching.

Figure 2:
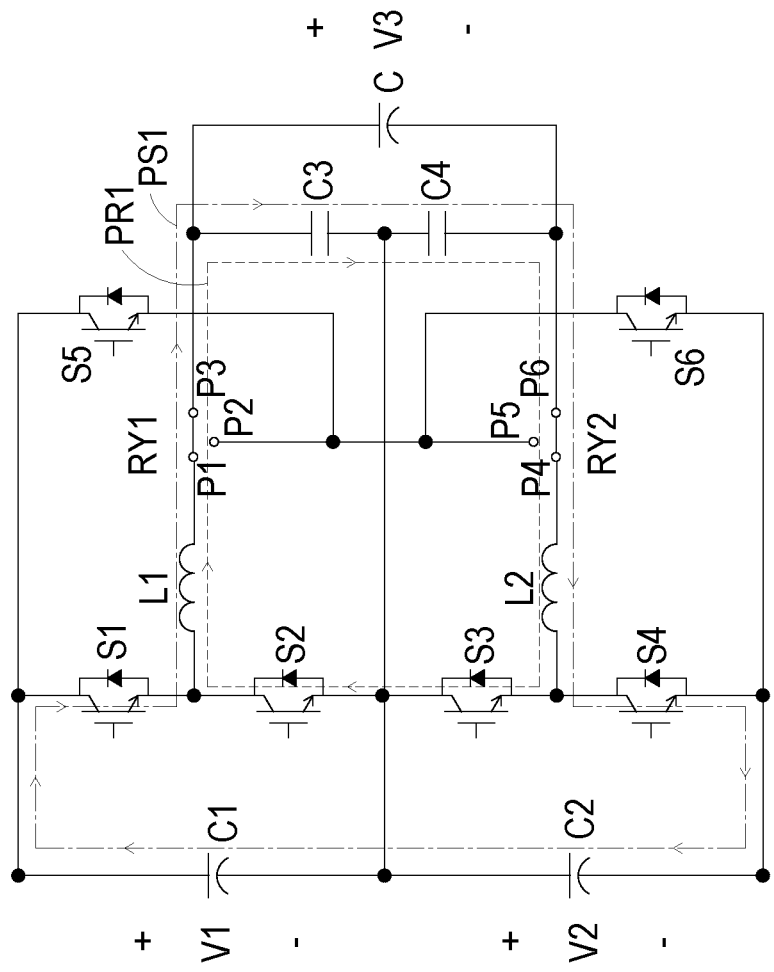
FIG. 2 is a schematic circuit diagram illustrating the power converter of the present disclosure in the first operation mode.

Please refer to FIG. 2. FIG. 2 is a schematic circuit diagram illustrating the power converter of the present disclosure in the first operation mode. As shown in FIG. 2, in the first operation mode, the first relay RY1 switches to connect the first inductor L1 to the first terminal of the first load capacitor C3, and the second relay RY2 switches to connect the second inductor L2 to the second terminal of the second load capacitor C4. Firstly, the first switch S1 and the fourth switch S4 are turned on so that energy stored in the first bus capacitor C1 and the second bus capacitor C2 is transmitted to be stored in the first inductor L1 and the second inductor L2 (through a first energy storage path PS1 shown in the figure). Then, the first switch S1 and the fourth switch S4 are turned off so that the energy stored in the first inductor L1 and the second inductor L2 is released to the first load capacitor C3 and the second load capacitor C4 (through a first energy release path PR1 shown in the figure). In the first operation mode, the power converter 1 transfers energy from the first bus capacitor C1 and the second bus capacitor C2 to the first load capacitor C3 and the second load capacitor C4, thereby realizing a DC-DC conversion (step-down) function.

Figure 3:
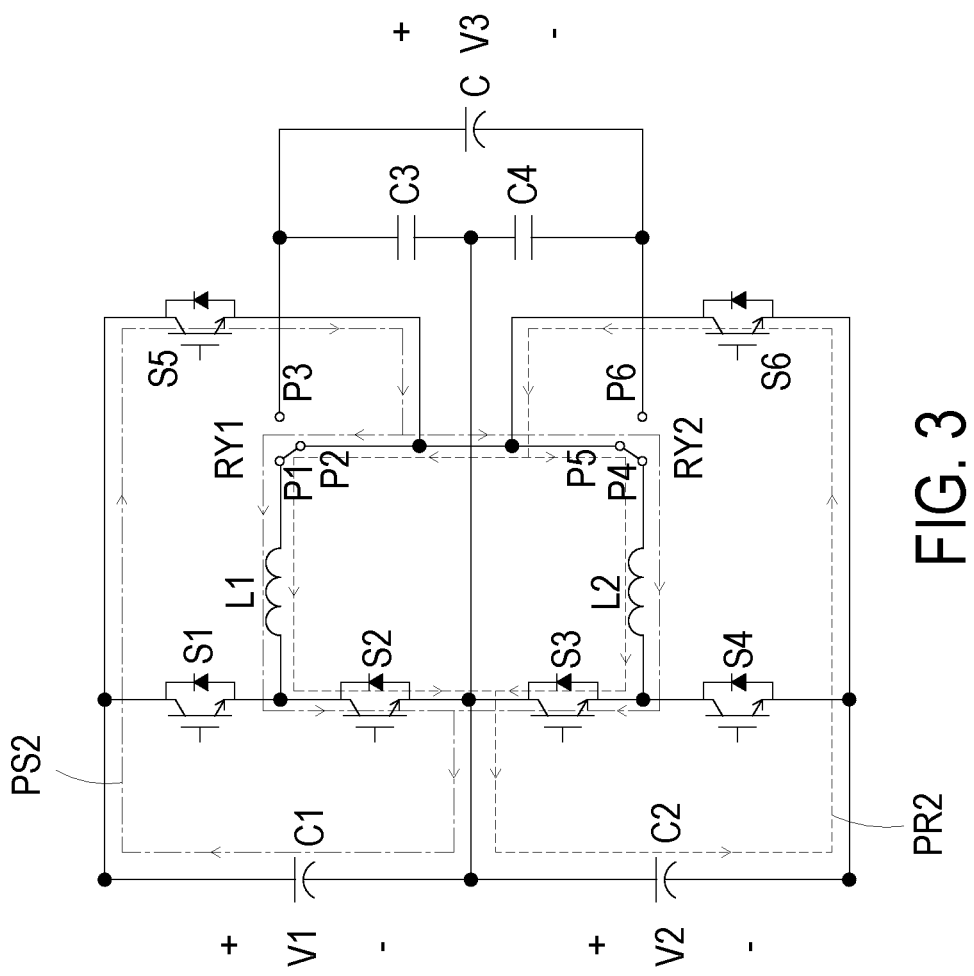
FIG. 3 is a schematic circuit diagram illustrating the power converter of the present disclosure in the second operation mode.

Please refer to FIG. 3. FIG. 3 is a schematic circuit diagram illustrating the power converter of the present disclosure in the second operation mode. As shown in FIG. 3, in the second operation mode, the first relay RY1 switches to connect the first inductor L1 to the second terminal of the fifth switch S5, and the second relay RY2 switches to connect the second inductor L2 to the first terminal of the sixth switch S6. Firstly, the second switch S2, the third switch S3, and the fifth switch S5 are turned on so that energy stored in the first bus capacitor C1 is transmitted to be stored in the first inductor L1 and the second inductor L2 (through a second energy storage path PS2 shown in the figure). Then, the second switch S2 and the third switch S3 are turned on and the fifth switch S5 is turned off so that the energy stored in the first inductor L1 and the second inductor L2 is released to the second bus capacitor C2 (through a second energy release path PR2 shown in the figure). In the second operation mode, the power converter 1 transfers energy from the first bus capacitor C1 to the second bus capacitor C2, thereby adjusting the energy stored in the first bus capacitor C1 and the second bus capacitor C2 to realize the balance of bus capacitor voltages.

Figure 4:
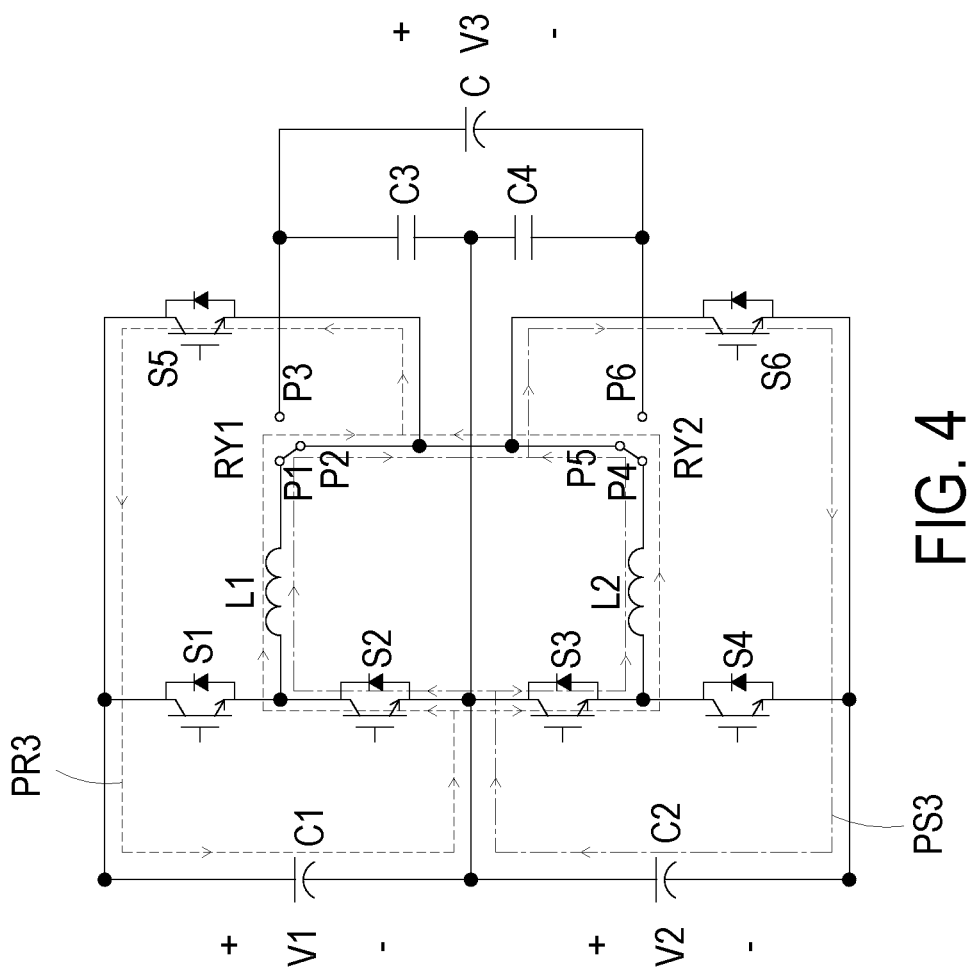
FIG. 4 is a schematic circuit diagram illustrating the power converter of the present disclosure in the third operation mode.

Please refer to FIG. 4. FIG. 4 is a schematic circuit diagram illustrating the power converter of the present disclosure in the third operation mode. As shown in FIG. 4, in the third operation mode, the first relay RY1 switches to connect the first inductor L1 to the second terminal of the fifth switch S5, and the second relay RY2 switches to connect the second inductor L2 to the first terminal of the sixth switch S6. Firstly, the second switch S2, the third switch S3, and the sixth switch S6 are turned on so that energy stored in the second bus capacitor C2 is transmitted to be stored in the first inductor L1 and the second inductor L2 (through a third energy storage path PS3 shown in the figure). Then, the second switch S2 and the third switch S3 are turned on and the sixth switch S6 is turned off so that the energy stored in the first inductor L1 and the second inductor L2 is released to the first bus capacitor C1 (through a third energy release path PR3 shown in the figure). In the third operation mode, the power converter 1 transfers energy from the second bus capacitor C2 to the first bus capacitor C1, thereby adjusting the energy stored in the first bus capacitor C1 and the second bus capacitor C2 to realize the balance of bus capacitor voltages.

Figure 5A:
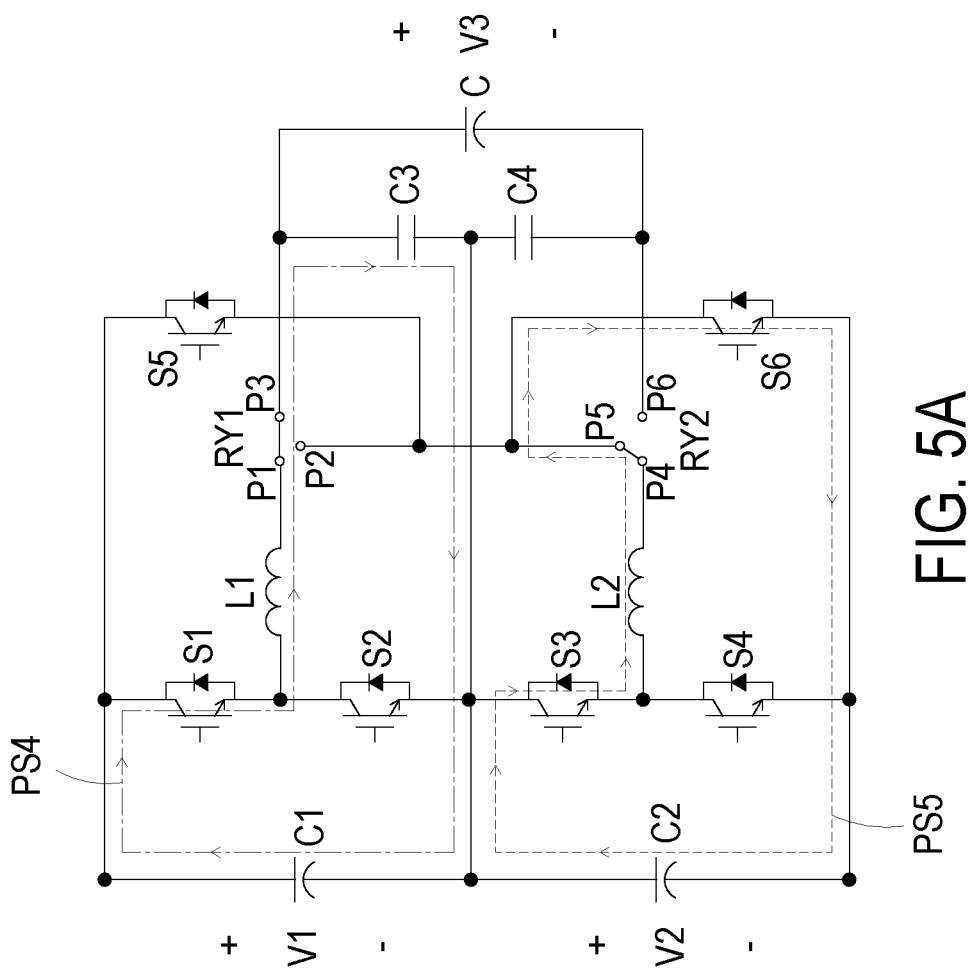
FIGS. 5A and 5B are schematic circuit diagrams illustrating the power converter of the present disclosure in the fourth operation mode.
Figure 5B:
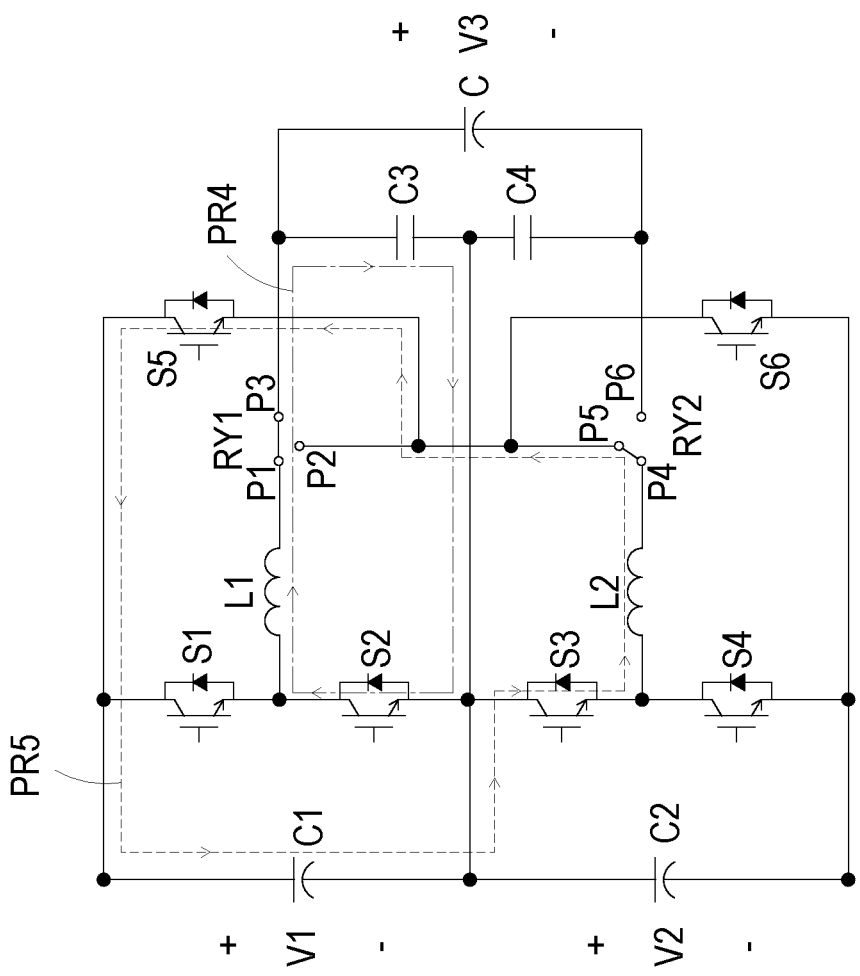

Please refer to FIGS. 5A and 5B. FIGS. 5A and 5B are schematic circuit diagrams illustrating the power converter of the present disclosure in the fourth operation mode. As shown in FIGS. 5A and 5B, in the fourth operation mode, the first relay RY1 switches to connect the first inductor L1 to the first terminal of the first load capacitor C3, and the second relay RY2 switches to connect the second inductor L2 to the first terminal of the sixth switch S6. Firstly, as shown in FIG. 5A, the first switch S1, the third switch S3, and the sixth switch S6 are turned on. Accordingly, energy stored in the first bus capacitor C1 is transmitted to be stored in the first inductor L1 (through a fourth energy storage path PS4 shown in the figure), and energy stored in the second bus capacitor C2 is transmitted to be stored in the second inductor L2 (through a fifth energy storage path PS5 shown in the figure). Then, as shown in FIG. 5B, the third switch S3 is turned on, and the first switch S1 and the sixth switch S6 are turned off. Accordingly, the energy stored in the first inductor L1 is released to the first load capacitor C3 (through a fourth energy release path PR4 shown in the figure), and the energy stored in the second inductor L2 is released to the first bus capacitor C1 (through a fifth energy release path PR5 shown in the figure). In the fourth operation mode, the power converter 1 transfers energy from the first bus capacitor C1 to the first load capacitor C3 and transfers energy from the second bus capacitor C2 to the first bus capacitor C1, thereby realizing the hybrid power supply.

Figure 6A:
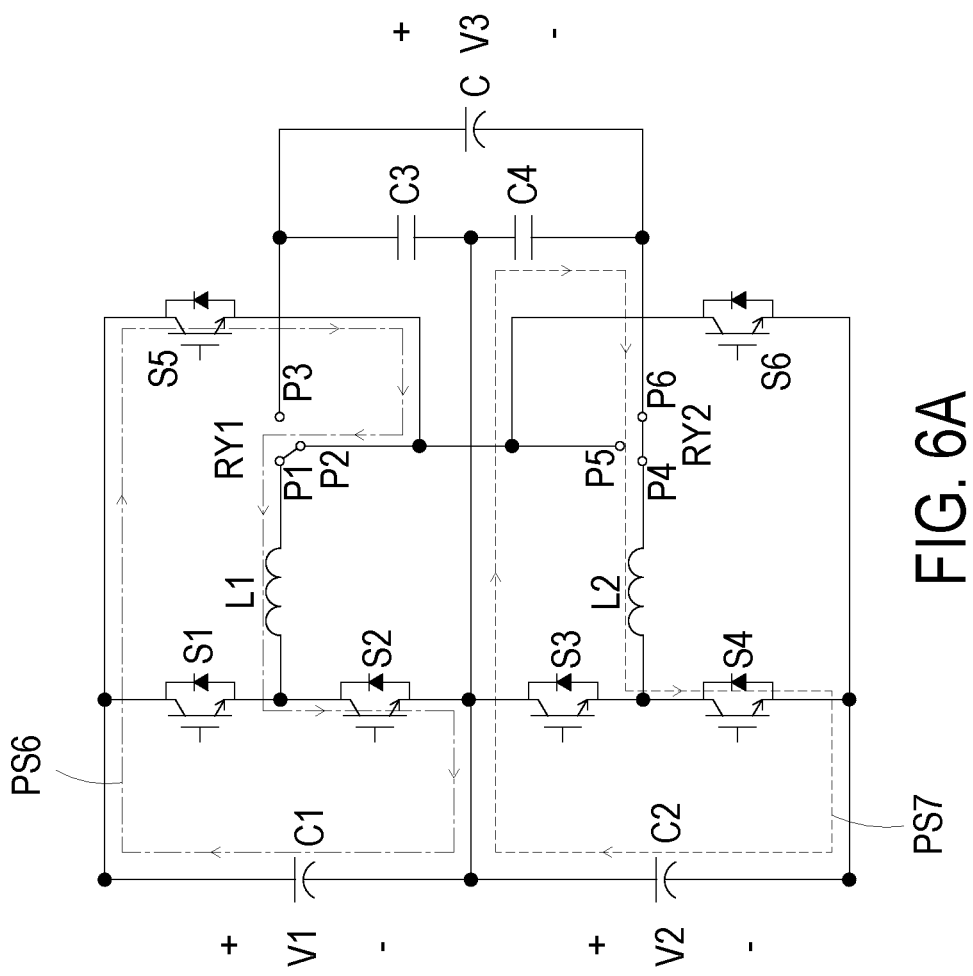
FIGS. 6A and 6B are schematic circuit diagrams illustrating the power converter of the present disclosure in the fifth operation mode.
Figure 6B:
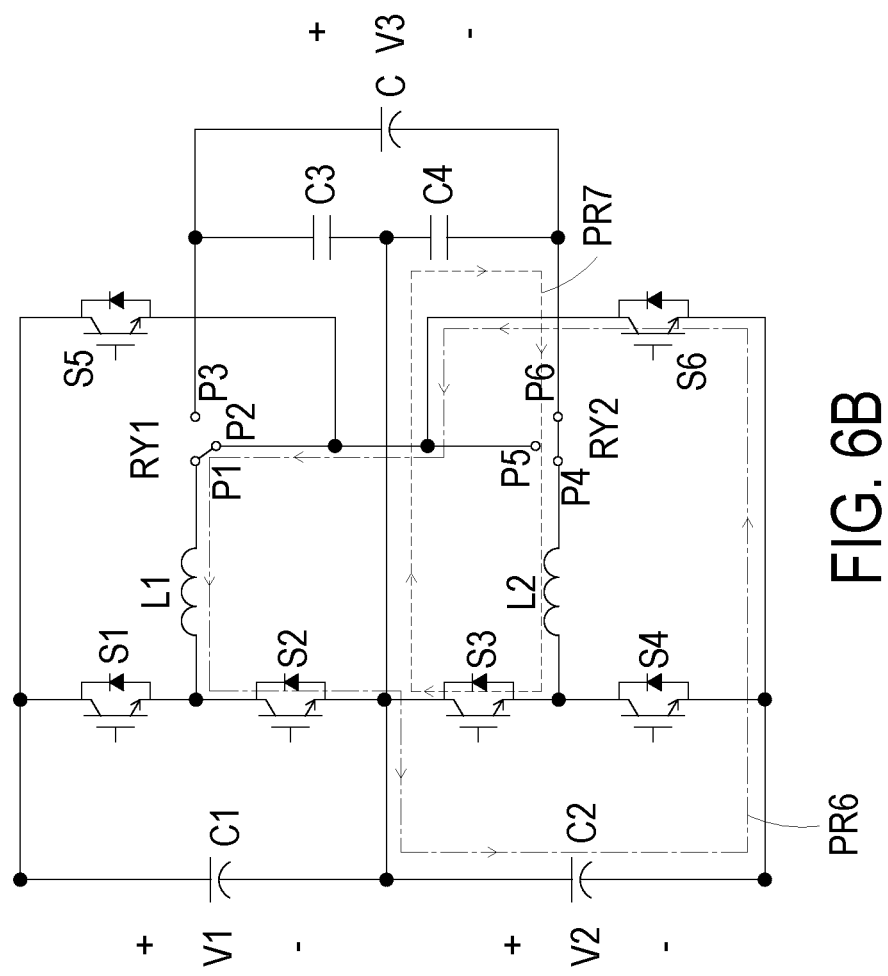

Please refer to FIGS. 6A and 6B. FIGS. 6A and 6B are schematic circuit diagrams illustrating the power converter of the present disclosure in the fifth operation mode. As shown in FIGS. 6A and 6B, in the fifth operation mode, the first relay RY1 switches to connect the first inductor L1 to the second terminal of the fifth switch S5, and the second relay RY2 switches to connect the second inductor L2 to the second terminal of the second load capacitor C4. Firstly, as shown in FIG. 6A, the second switch S2, the fourth switch S4, and the fifth switch S5 are turned on. Accordingly, energy stored in the first bus capacitor C1 is transmitted to be stored in the first inductor L1 (through a sixth energy storage path PS6 shown in the figure), and energy stored in the second bus capacitor C2 is transmitted to be stored in the second inductor L2 (through a seventh energy storage path PS7 shown in the figure). Then, as shown in FIG. 6B, the second switch S2 is turned on, and the fourth switch S4 and the fifth switch S5 are turned off. Accordingly, the energy stored in the first inductor L1 is released to the second bus capacitor C2 (through a sixth energy release path PR6 shown in the figure), and the energy stored in the second inductor L2 is released to the second load capacitor C4 (through a seventh energy release path PR7 shown in the figure). In the fifth operation mode, the power converter 1 transfers energy from the first bus capacitor C1 to the second bus capacitor C2 and transfers energy from the second bus capacitor C2 to the second load capacitor C4, thereby realizing hybrid power supply.

Figure 7:
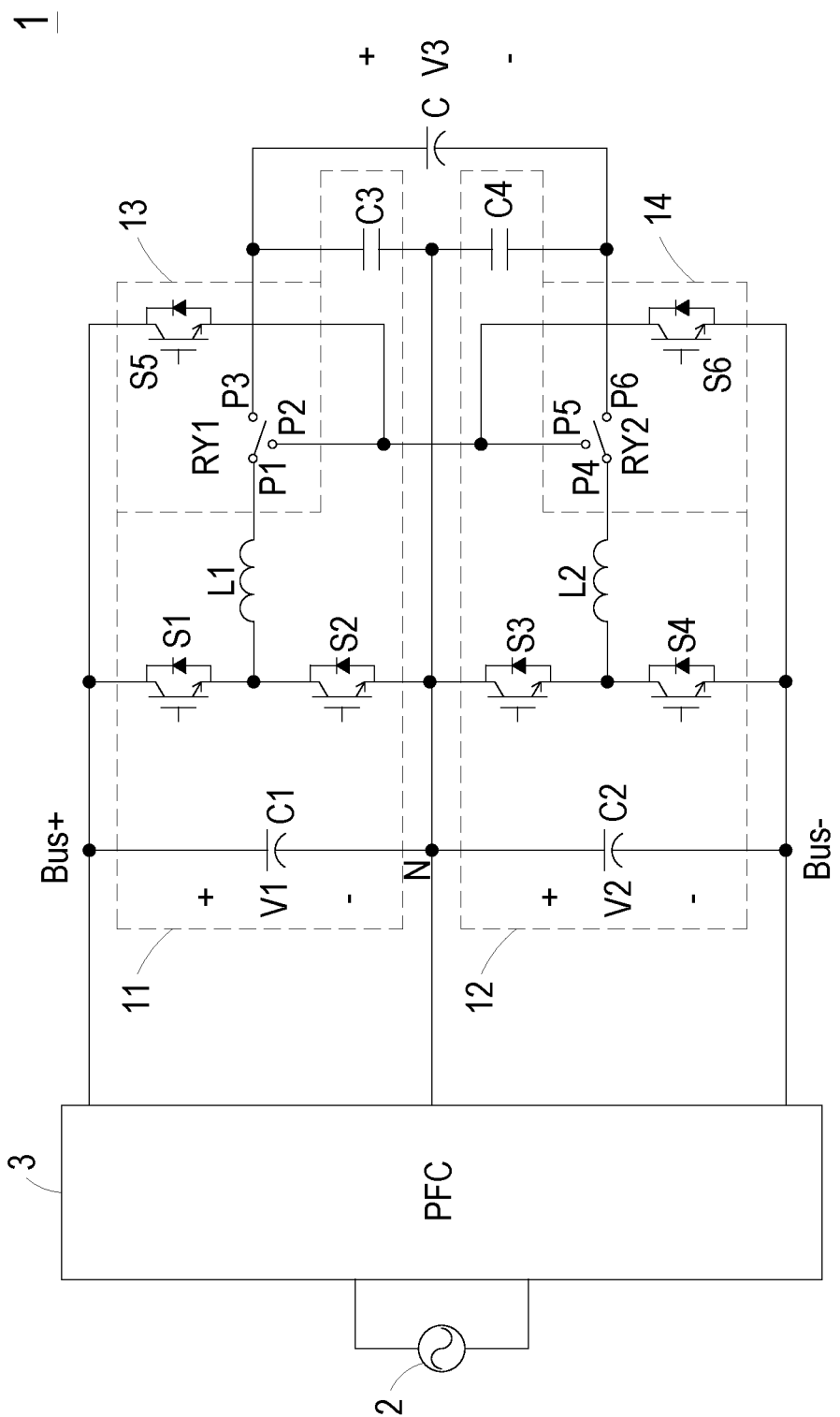
FIG. 7 is a schematic circuit diagram illustrating a power converter according to a second embodiment of the present disclosure.

Please refer to FIG. 7. FIG. 7 is a schematic circuit diagram illustrating a power converter according to a second embodiment of the present disclosure. Different from the first embodiment shown in FIG. 1, the power converter of the second embodiment shown in FIG. 7 further includes a power factor correction converter (PFC) 3. In the second embodiment, as shown in FIG. 7, the first upper-bridge voltage conversion module 11, the first lower-bridge voltage conversion module 12, the second upper-bridge voltage conversion module 13, and the second lower-bridge voltage conversion module 14 form a buck converter, the power source 2 is an AC power source, and the power factor correction converter 3 is connected between the power source 2 and the buck converter.

Figure 8:
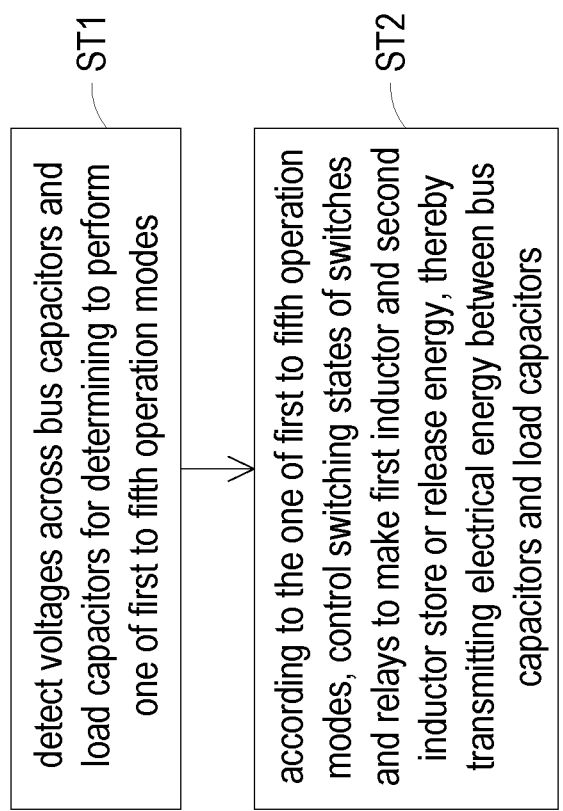
FIG. 8 is a schematic flow chart illustrating a power conversion method according to an embodiment of the present disclosure.

Please refer to FIG. 8. FIG. 8 is a schematic flow chart illustrating a power conversion method according to an embodiment of the present disclosure. The power conversion method is applicable to the power converter of any of the foregoing embodiments. As shown in FIG. 8, the power conversion method includes steps ST1 and ST2. Firstly, in the step ST1, voltages across the first bus capacitor C1, the second bus capacitor C2, the first load capacitor C3, and the second load capacitor C4 are detected for determining to perform one of the first operation mode, the second operation mode, the third operation mode, the fourth operation mode, and the fifth operation mode. Then, in the step ST2, according to the one of the first to fifth operation modes, switching states of the first switch S1, the second switch S2, the third switch S3, the fourth switch S4, the fifth switch S5, the sixth switch S6, the first relay RY1, and the second relay RY2 are controlled to make the first inductor L1 and the second inductor L2 store or release energy, thereby transmitting electrical energy between the first bus capacitor C1, the second bus capacitor C2, the first load capacitor C3, and the second load capacitor C4.

In the first operation mode, the power conversion method includes following steps. Firstly, switch the first relay RY1 to connect the first inductor L1 to the first terminal of the first load capacitor C3, and switch the second relay RY2 to connect the second inductor L2 to the second terminal of the second load capacitor C4. Then, turn on the first switch S1 and the fourth switch S4 for transmitting the energy stored in the first bus capacitor C1 and the second bus capacitor C2 to be stored in the first inductor L1 and the second inductor L2. Finally, turn off the first switch S1 and the fourth switch S4 for releasing the energy stored in the first inductor L1 and the second inductor L2 to the first load capacitor C3 and the second load capacitor C4.

In the second operation mode, the power conversion method includes following steps. Firstly, switch the first relay RY1 to connect the first inductor L1 to the second terminal of the fifth switch S5, and switch the second relay RY2 to connect the second inductor L2 to the first terminal of the sixth switch S6. Then, turn on the second switch S2, the third switch S3, and the fifth switch S5 for transmitting the energy stored in the first bus capacitor C1 to be stored in the first inductor L1 and the second inductor L2. Finally, turn on the second switch S2 and the third switch S3 and turn off the fifth switch S5 for releasing the energy stored in the first inductor L1 and the second inductor L2 to the second bus capacitor C2.

In the third operation mode, the power conversion method includes following steps. Firstly, switch the first relay RY1 to connect the first inductor L1 to the second terminal of the fifth switch S5, and switch the second relay RY2 to connect the second inductor L2 to the first terminal of the sixth switch S6. Then, turn on the second switch S2, the third switch S3, and the sixth switch S6 for transmitting the energy stored in the second bus capacitor C2 to be stored in the first inductor L1 and the second inductor L2. Finally, turn on the second switch S2 and the third switch S3 and turn off the sixth switch S6 for releasing the energy stored in the first inductor L1 and the second inductor L2 to the first bus capacitor C1.

In the fourth operation mode, the power conversion method includes following steps. Firstly, switch the first relay RY1 to connect the first inductor L1 to the first terminal of the first load capacitor C3, and switch the second relay RY2 to connect the second inductor L2 to the first terminal of the sixth switch S6. Then, turn on the first switch S1, the third switch S3, and the sixth switch S6 for transmitting the energy stored in the first bus capacitor C1 to be stored in the first inductor L1 and transmitting the energy stored in the second bus capacitor C2 to be stored in the second inductor L2. Finally, turn on the third switch S3 and turn off the first switch S1 and the sixth switch S6 for releasing the energy stored in the first inductor L1 to the first load capacitor C3 and releasing the energy stored in the second inductor L2 to the first bus capacitor C1.

In the fifth operation mode, the power conversion method includes following steps. Firstly, switch the first relay RY1 to connect the first inductor L1 to the second terminal of the fifth switch S5, and switch the second relay RY2 to connect the second inductor L2 to the second terminal of the second load capacitor C4. Then, turn on the second switch S2, the fourth switch S4, and the fifth switch S5 for transmitting the energy stored in the first bus capacitor C1 to be stored in the first inductor L1 and transmitting the energy stored in the second bus capacitor C2 to be stored in the second inductor L2. Finally, turn on the second switch S2 and turn off the fourth switch S4 and the fifth switch S5 for releasing the energy stored in the first inductor L1 to the second bus capacitor C2 and releasing the energy stored in the second inductor L2 to the second load capacitor C4.

In summary, the present disclosure provides a power converter and a power conversion method which realize a balance of capacitor voltages based on inherent inductor components of converter. Compared with the conventional approach that adds a balance circuit, the power converter and the power conversion method of the present disclosure can reduce a size of overall circuit and improve a power density. In addition, through transmitting electrical energy between capacitors and inductors, the power converter and the power conversion method of the present disclosure are able to realize energy balance and hybrid power supply and satisfy various load requirements.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power converter, comprising:
    a first upper-bridge voltage conversion module comprising a first bus capacitor, a first switch, a second switch, a first inductor and a first load capacitor, wherein the first switch, the second switch and the first inductor are electrically connected between the first bus capacitor and the first load capacitor;
    a first lower-bridge voltage conversion module comprising a second bus capacitor, a third switch, a fourth switch, a second inductor and a second load capacitor, wherein the third switch, the fourth switch and the second inductor are electrically connected between the second bus capacitor and the second load capacitor;
    a second upper-bridge voltage conversion module comprising a fifth switch and a first relay, wherein a first terminal of the fifth switch is connected to a first terminal of the first bus capacitor, the first relay is configured to selectively switch to connect the first inductor to a second terminal of the fifth switch or a first terminal of the first load capacitor, and a second terminal of the first load capacitor is connected to a second terminal of the first bus capacitor; and
    a second lower-bridge voltage conversion module comprising a sixth switch and a second relay, wherein a first terminal of the second load capacitor is connected to a first terminal of the second bus capacitor, the second relay is configured to selectively switch to connect the second inductor to a first terminal of the sixth switch or a second terminal of the second load capacitor, and a second terminal of the sixth switch is connected to a second terminal of the second bus capacitor,
    wherein the first switch, the second switch, the third switch, the fourth switch, the fifth switch, the sixth switch, the first relay and the second relay are configured to switch switching states such that the first inductor and the second inductor store or release energy, thereby transmitting electrical energy between the first bus capacitor, the second bus capacitor, the first load capacitor and the second load capacitor.

2. The power converter according to claim 1, wherein the first relay comprises a first moving contact, a first static contact and a second static contact respectively connected to the first inductor, the second terminal of the fifth switch and the first terminal of the first load capacitor; when the first relay switches the first moving contact to connect to the first static contact, the first inductor is connected to the second terminal of the fifth switch; and when the first relay switches the first moving contact to connect to the second static contact, the first inductor is connected to the first terminal of the first load capacitor.

3. The power converter according to claim 1, wherein the second relay comprises a second moving contact, a third static contact and a fourth static contact respectively connected to the second inductor, the first terminal of the sixth switch and the second terminal of the second load capacitor; when the second relay switches the second moving contact to connect to the third static contact, the second inductor is connected to the first terminal of the sixth switch; and when the second relay switches the second moving contact to connect to the fourth static contact, the second inductor is connected to the second terminal of the second load capacitor.

4. The power converter according to claim 1, wherein the second terminal of the fifth switch and the first terminal of the sixth switch are connected to each other.

5. The power converter according to claim 1, wherein a first terminal and a second terminal of the first switch are respectively connected to the first terminal of the first bus capacitor and a first terminal of the second switch, a second terminal of the second switch is connected to the second terminal of the first bus capacitor, a first terminal of the first inductor is connected to the second terminal of the first switch and the first terminal of the second switch, and a second terminal of the first inductor is connected to the first relay.

6. The power converter according to claim 1, wherein a first terminal and a second terminal of the third switch are respectively connected to the first terminal of the second bus capacitor and a first terminal of the fourth switch, a second terminal of the fourth switch is connected to the second terminal of the second bus capacitor, a first terminal of the second inductor is connected to the second terminal of the third switch and the first terminal of the fourth switch, and a second terminal of the second inductor is connected to the second relay.

7. The power converter according to claim 1, wherein the first bus capacitor is configured to establish a first voltage, the second bus capacitor is configured to establish a second voltage, and the first load capacitor and the second load capacitor are configured to establish a third voltage.

8. The power converter according to claim 1, further comprising a neutral terminal, a power source and a load, wherein the power source is connected to the first and second terminals of the first bus capacitor and the first and second terminals of the second bus capacitor, the load is connected to the first terminal of the first load capacitor and the second terminal of the second load capacitor, the neutral terminal is connected to the second terminal of the first bus capacitor, the first terminal of the second bus capacitor, the second terminal of the first load capacitor, the first terminal of the second load capacitor, a second terminal of the second switch and a first terminal of the third switch.

9. The power converter according to claim 1, further comprising a power source and a power factor correction converter, wherein the first upper-bridge voltage conversion module, the first lower-bridge voltage conversion module, the second upper-bridge voltage conversion module and the second lower-bridge voltage conversion module form a buck converter, and the power factor correction converter is connected between the power source and the buck converter.

10. A power conversion method applied to the power converter as claimed in claim 1, and the power conversion method comprising steps of:
    detecting voltages across the first bus capacitor, the second bus capacitor, the first load capacitor and the second load capacitor for determining to perform one of a first operation mode, a second operation mode, a third operation mode, a fourth operation mode and a fifth operation mode; and
    according to the one of the first to fifth operation modes, controlling switching states of the first switch, the second switch, the third switch, the fourth switch, the fifth switch, the sixth switch, the first relay and the second relay to make the first inductor and the second inductor store or release energy, thereby transmitting electrical energy between the first bus capacitor, the second bus capacitor, the first load capacitor and the second load capacitor.

11. The power conversion method according to claim 10, wherein in the first operation mode, the power conversion method comprises steps of:
   switching the first relay to connect the first inductor to the first terminal of the first load capacitor, and switching the second relay to connect the second inductor to the second terminal of the second load capacitor;
   turning on the first switch and the fourth switch for transmitting energy stored in the first bus capacitor and the second bus capacitor to be stored in the first inductor and the second inductor; and
   turning off the first switch and the fourth switch for releasing energy stored in the first inductor and the second inductor to the first load capacitor and the second load capacitor.

12. The power conversion method according to claim 10, wherein in the second operation mode, the power conversion method comprises steps of:
   switching the first relay to connect the first inductor to the second terminal of the fifth switch, and switching the second relay to connect the second inductor to the first terminal of the sixth switch;
   turning on the second switch, the third switch and the fifth switch for transmitting energy stored in the first bus capacitor to be stored in the first inductor and the second inductor; and
   turning on the second switch and the third switch and turning off the fifth switch for releasing energy stored in the first inductor and the second inductor to the second bus capacitor.

13. The power conversion method according to claim 10, wherein in the third operation mode, the power conversion method comprises steps of:
   switching the first relay to connect the first inductor to the second terminal of the fifth switch, and switching the second relay to connect the second inductor to the first terminal of the sixth switch;
   turning on the second switch, the third switch and the sixth switch for transmitting energy stored in the second bus capacitor to be stored in the first inductor and the second inductor; and
   turning on the second switch and the third switch and turning off the sixth switch for releasing energy stored in the first inductor and the second inductor to the first bus capacitor.

14. The power conversion method according to claim 10, wherein in the fourth operation mode, the power conversion method comprises steps of:
   switching the first relay to connect the first inductor to the first terminal of the first load capacitor, and switching the second relay to connect the second inductor to the first terminal of the sixth switch;
   turning on the first switch, the third switch and the sixth switch for transmitting energy stored in the first bus capacitor to be stored in the first inductor and transmitting energy stored in the second bus capacitor to be stored in the second inductor; and
   turning on the third switch and turning off the first switch and the sixth switch for releasing energy stored in the first inductor to the first load capacitor and releasing energy stored in the second inductor to the first bus capacitor.

15. The power conversion method according to claim 10, wherein in the fifth operation mode, the power conversion method comprises steps of:
   switching the first relay to connect the first inductor to the second terminal of the fifth switch, and switching the second relay to connect the second inductor to the second terminal of the second load capacitor;
   turning on the second switch, the fourth switch and the fifth switch for transmitting energy stored in the first bus capacitor to be stored in the first inductor and transmitting energy stored in the second bus capacitor to be stored in the second inductor; and
   turning on the second switch and turning off the fourth switch and the fifth switch for releasing energy stored in the first inductor to the second bus capacitor and releasing energy stored in the second inductor to the second load capacitor.

* * * * *